(12) United States Patent
Tang

(10) Patent No.: US 9,110,188 B2
(45) Date of Patent: Aug. 18, 2015

(54) DETECTING BED BOUNDARY LOCATIONS BASED ON GRADIENTS DETERMINED FROM MEASUREMENTS FROM MULTIPLE TOOL DEPTHS IN A WELLBORE

(71) Applicant: Halliburton Eneregy Services, Inc., Houston, TX (US)

(72) Inventor: Yumei Tang, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/358,012

(22) PCT Filed: Jul. 12, 2013

(86) PCT No.: PCT/US2013/050359
§ 371 (c)(1),
(2) Date: May 13, 2014

(87) PCT Pub. No.: WO2015/005937
PCT Pub. Date: Jan. 15, 2015

(65) Prior Publication Data
US 2015/0088426 A1 Mar. 26, 2015

(51) Int. Cl.
*G01V 3/20* (2006.01)
*E21B 47/026* (2006.01)
(Continued)

(52) U.S. Cl.
CPC ............... *G01V 3/20* (2013.01); *E21B 47/026* (2013.01); *G01V 3/087* (2013.01); *G01V 3/24* (2013.01); *G01V 3/38* (2013.01)

(58) Field of Classification Search
CPC ............. G01V 3/28; G01V 3/30; G01V 3/12; G01V 3/20; G01V 3/26; G01V 3/38; G01V 3/083; G01V 3/24; G01V 11/007; G01V 2003/084; G01V 2210/6163; G01V 3/00; G01V 11/00; G01V 11/002; G01V 13/00
USPC .................................................. 324/338–339
See application file for complete search history.

(56) References Cited

U.S. PATENT DOCUMENTS 4,899,112 A 2/1990 Clark et al.
6,163,155 A 12/2000 Bittar
(Continued)

FOREIGN PATENT DOCUMENTS

WO WO 2008/115229 9/2008
WO WO 2012/144981 10/2012
WO WO 2013/048375 4/2013

OTHER PUBLICATIONS

International Search Report and Written Opinion of the International Searching Authority issued in International Application No. PCT/US2013/050359 on Apr. 15, 2014; 9 pages.
(Continued)

*Primary Examiner* — Jay Patidar
(74) *Attorney, Agent, or Firm* — Benjamin Fite; Fish & Richardson P.C.

(57) ABSTRACT

Systems, methods, and software for detecting bed boundary locations are described. In some aspects, the boundaries of a subsurface layer are identified based on a measurement from a logging point and a gradient associated with the measurement from the logging point. A first measurement is generated based on operating a transmitter and a receiver of a resistivity logging tool at a first tool depth. The gradient is calculated from the first measurement and a second measurement. The second measurement is generated based on operating the transmitter and the receiver of the resistivity logging tool at a second, different tool depth.

20 Claims, 7 Drawing Sheets

(51) Int. Cl.
*G01V 3/24* (2006.01)
*G01V 3/08* (2006.01)
*G01V 3/38* (2006.01)

(56) References Cited

U.S. PATENT DOCUMENTS

| | | |
|---|---|---|
| 6,304,086 B1 | 10/2001 | Minerbo et al. |
| 7,659,722 B2 | 2/2010 | Bittar |
| 7,937,221 B2 | 5/2011 | Zhdanov |
| 8,085,049 B2 | 12/2011 | Bittar |
| 8,085,050 B2 | 12/2011 | Bittar et al. |
| 2007/0265784 A1 | 11/2007 | Bal et al. |
| 2011/0061935 A1 | 3/2011 | Mullins et al. |
| 2011/0180327 A1* | 7/2011 | Bittar et al. ............ 175/61 |

OTHER PUBLICATIONS

Patent Examiner Wayne O'Connell, Patent Examination Report No. 1, Australian Patent Office, Australian Patent Application No. 2013377236, Feb. 18, 2015, 3 pages.

* cited by examiner

DETECTING BED BOUNDARY LOCATIONS BASED ON GRADIENTS DETERMINED FROM MEASUREMENTS FROM MULTIPLE TOOL DEPTHS IN A WELLBORE

CLAIM OF PRIORITY

This application is a U.S. National Stage of PCT/US2013/050359 filed on Jul. 12, 2013.

BACKGROUND

This specification relates to detecting bed boundary locations, for example, based on resistivity measurements from multiple tool depths in a wellbore.

In the field of wireline logging and logging while drilling, electromagnetic resistivity logging tools have been used to explore the subsurface based on the electrical resistivity (or its inverse, conductivity) of rock formations. Some resistivity logging tools include multiple antennas for transmitting an electromagnetic signal into the formation and multiple receiver antennas for receiving a formation response. Properties of the subsurface layers in the formation can be identified from the formation response detected by the receivers.

DESCRIPTION OF DRAWINGS

Like reference symbols in the various drawings indicate like elements.

DETAILED DESCRIPTION

Some aspects of this specification describe robust inversion techniques. In some implementations, the inversion techniques can be used, for example, to efficiently calculate distance to bed boundaries (DTBB) from directional logging while drilling (LWD) measurements. For example, subsurface layer boundary locations can be identified in real-time during drilling or other types of operations. The boundary location information can be determined from the difference between measurements generated by operating a resistivity logging tool at different positions in a wellbore.

In some cases, the techniques described here are robust against many types of conditions or phenomena. For example, the boundary locations can be determined from a single measurement at a given tool depth, even if the measurement is close to zero. The boundary location information can be used for many purpose, such as, for example, geosteering decisions (controlling drilling direction, etc.) and others. The techniques described here can be implemented by various types of computing systems and apparatus. For example, in some instances, some or all of the operations can be performed by a processor embedded in a logging tool. Moreover, the techniques described here can be implemented to realize real-time bed boundary detection in the wellbore or elsewhere.

Figure 1A:
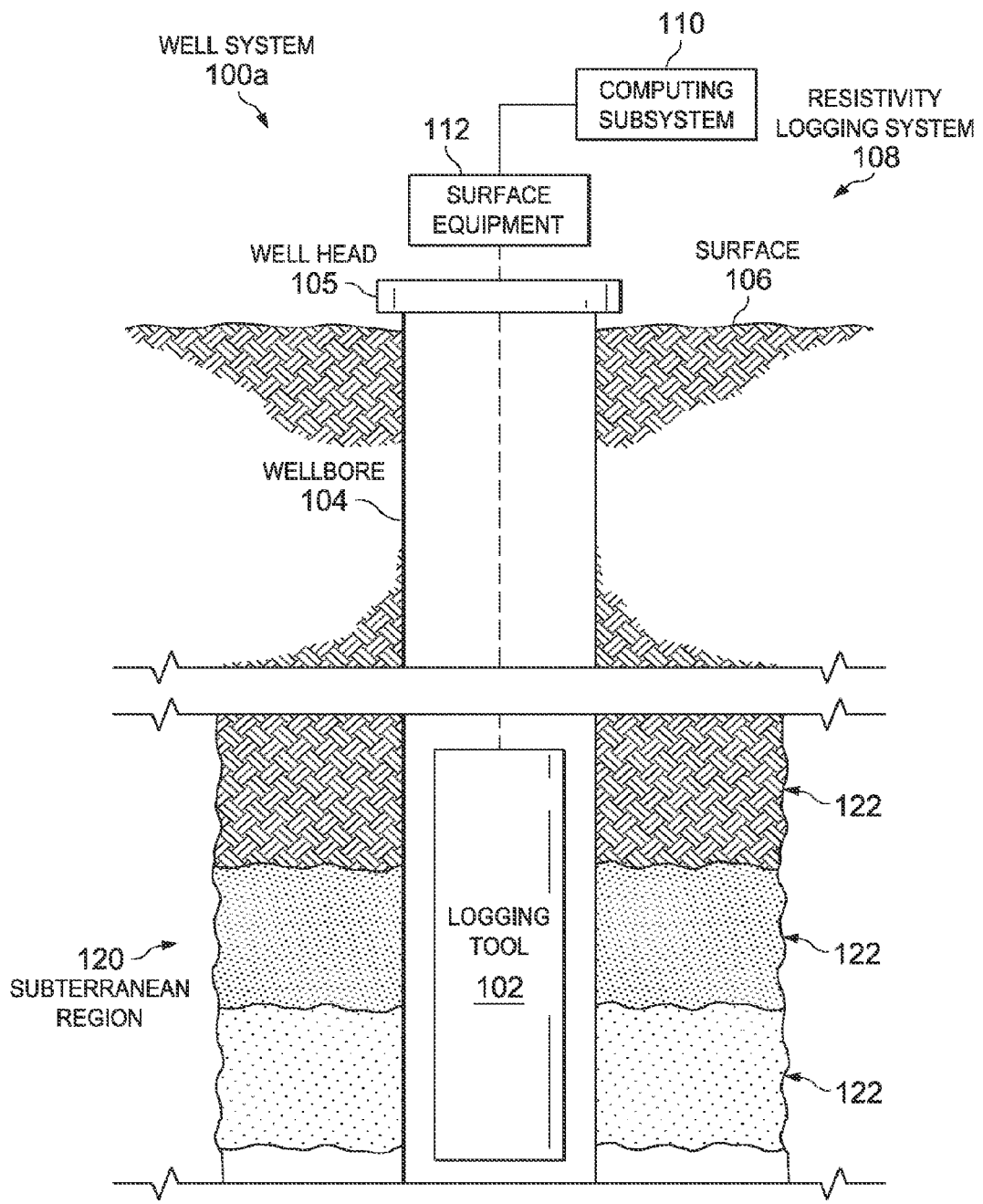
FIG. 1A is a diagram of an example well system.

FIG. 1A is a diagram of an example well system 100. The example well system 100 includes a resistivity logging system 108 and a subterranean region 120 beneath the ground surface 106. A well system can include additional or different features that are not shown in FIG. 1A. For example, the well system 100 may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrated through the subsurface layers 122. The subsurface layers 122 can include sedimentary layers, rock layers, sand layers, or combinations of these other types of subsurface layers. One or more of the subsurface layers can contain fluids, such as brine, oil, gas, etc. Although the example wellbore 104 shown in FIG. 1A is a vertical wellbore, the resistivity logging system 108 can be implemented in other wellbore orientations. For example, the resistivity logging system 108 may be adapted for horizontal wellbores, slant wellbores, curved wellbores, vertical wellbores, or combinations of these.

The example resistivity logging system 108 includes a logging tool 102, surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, for example, near the well head 105, to control the logging tool 102 and possibly other downhole equipment or other components of the well system 100. The example computing subsystem 110 can receive and analyze logging data from the logging tool 102. A resistivity logging system can include additional or different features, and the features of a resistivity logging system can be arranged and operated as represented in FIG. 1A or in another manner.

In some instances, all or part of the computing subsystem 110 can be implemented as a component of, or can be integrated with one or more components of, the surface equipment 112, the logging tool 102 or both. In some cases, the computing subsystem 110 can be implemented as one or more discrete computing system structures separate from the surface equipment 112 and the logging tool 102. The computing subsystem 110 can be or include the example computing system 200 shown in FIG. 2, other types of computing apparatus, or a combination of them.

In some implementations, the computing subsystem 110 is embedded in the logging tool 102, and the computing subsystem 110 and the logging tool 102 can operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102.

The well system 100 can include communication or telemetry equipment that allow communication among the computing subsystem 110, the logging tool 102, and other components of the resistivity logging system 108. For example, the components of the resistivity logging system 108 can each include one or more transceivers or similar apparatus for wired or wireless data communication among the various components. For example, the resistivity logging system 108 can include systems and apparatus for wireline telemetry, wired pipe telemetry, mud pulse telemetry, acoustic telemetry, electromagnetic telemetry, or a combination of these other types of telemetry. In some cases, the logging tool 102 receives commands, status signals, or other types of information from the computing subsystem 110 or another source. In some cases, the computing subsystem 110 receives logging data, status signals, or other types of information from the logging tool 102 or another source.

Resistivity logging operations can be performed in connection with various types of downhole operations at various stages in the lifetime of a well system. Many of the structural attributes and components of the surface equipment 112 and logging tool 102 will depend on the context of the resistivity logging operations. For example, resistivity logging may be performed during drilling operations, during wireline logging operations, or in other contexts. As such, the surface equipment 112 and the logging tool 102 may include, or may operate in connection with drilling equipment, wireline logging equipment, or other equipment for other types of operations.

Figure 1B:
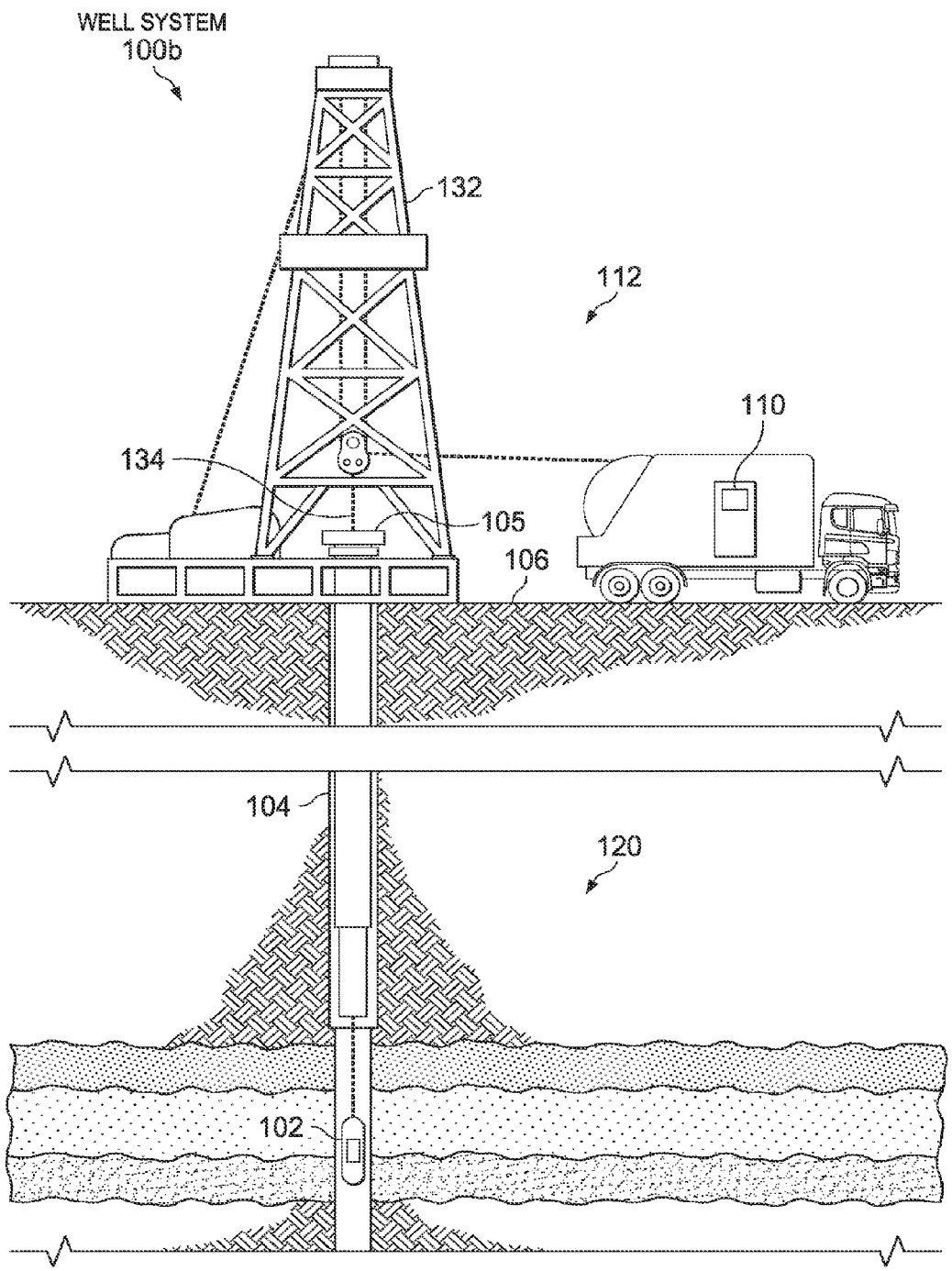
FIG. 1B is a diagram of an example well system that includes a resistivity logging tool in a wireline logging environment.

In some examples, resistivity logging operations are performed during wireline logging operations. FIG. 1B shows an example well system 100b that includes the resistivity logging tool 102 in a wireline logging environment. In some example wireline logging operations, a the surface equipment 112 includes a platform above the surface 106 is equipped with a derrick 132 that supports a wireline cable 134 that extends into the wellbore 104. Wireline logging operations can be performed, for example, after a drilling string is removed from the wellbore 104, to allow a the wireline logging tool 102 to be lowered by wireline or logging cable into the wellbore 104.

Figure 1C:
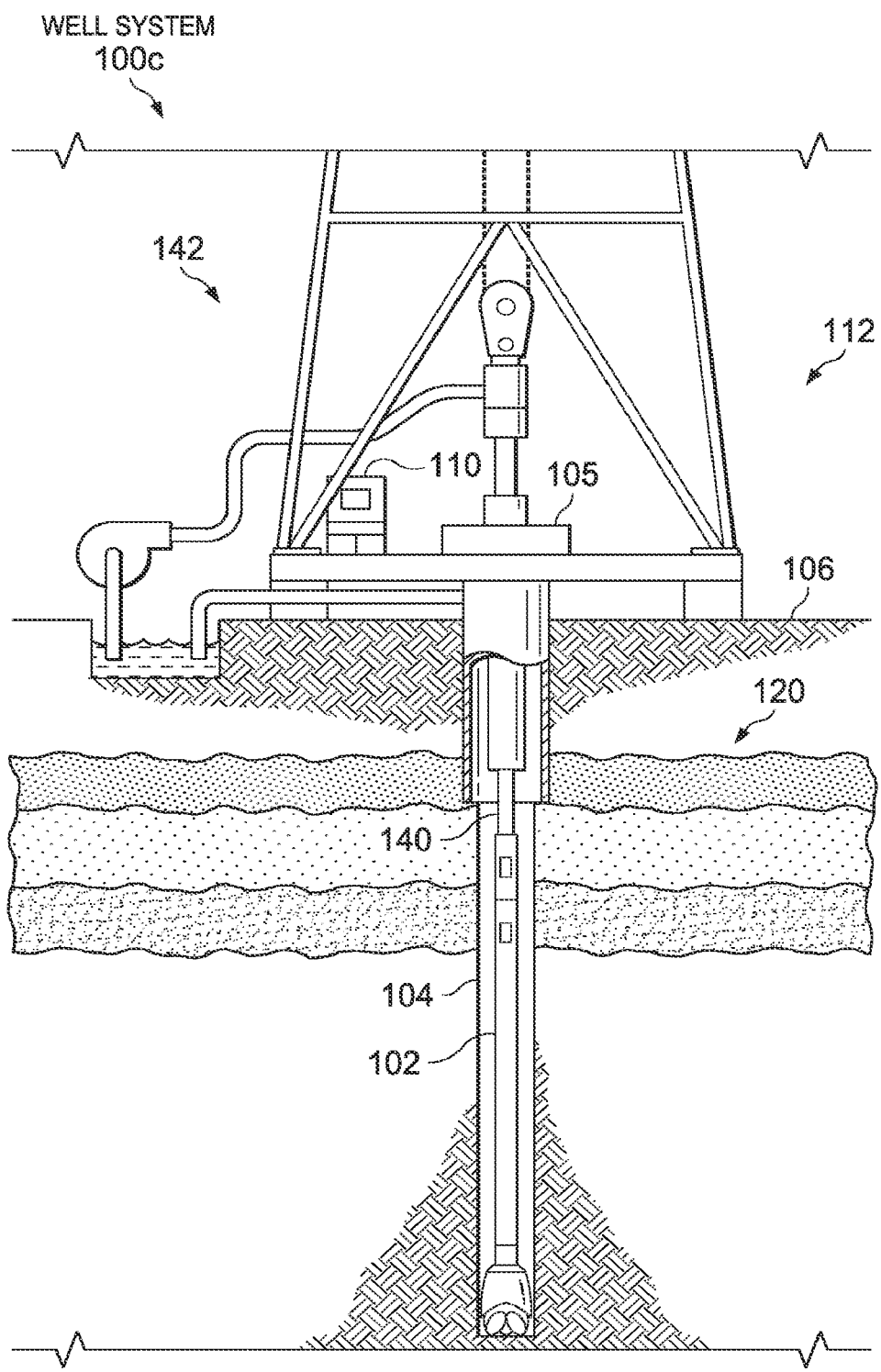
FIG. 1C is a diagram of an example well system that includes a resistivity logging tool in a logging while drilling (LWD) environment.

In some examples, resistivity logging operations are performed during drilling operations. FIG. 1C shows an example well system 100c that includes the resistivity logging tool 102 in a logging while drilling (LWD) environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill a wellbore penetrating the subterranean region 120. The drill string may include, for example, a kelly, drill pipe, a bottom hole assembly, and other components. The bottom hole assembly on the drill string may include drill collars, drill bits, the logging tool 102, and other components. The logging tools may include measuring while drilling (MWD) tools, LWD tools, and others.

In some example implementations, the logging tool 102 includes a formation resistivity tool for obtaining resistivity measurements from the subterranean region 120. As shown, for example, in FIG. 1B, the logging tool 102 can be suspended in the wellbore 104 by a wireline cable, coiled tubing, or another structure that connects the tool to a surface control unit or other components of the surface equipment 112. In some example implementations, the logging tool 102 is lowered to the bottom of a region of interest and subsequently pulled upward (e.g., at a substantially constant speed) through the region of interest. As shown, for example, in FIG. 1C, the logging tool 102 can be deployed in the wellbore 104 on jointed drill pipe, hard wired drill pipe, or other deployment hardware. In some example implementations, the logging tool 102 collects data during drilling operations as it moves downward through the region of interest during drilling operations.

In some example implementations, the logging tool 102 collects data at discrete logging points in the wellbore 104. For example, the logging tool 102 can move upward or downward incrementally to each logging point at a series of depths in the wellbore 104. At each logging point, instruments in the logging tool 102 (e.g., the transmitters and receivers shown in FIG. 3) perform measurements on the subterranean region 120. The measurement data can be communicated to the computing subsystem 110 for storage, processing, and analysis. Such formation evaluation data may be gathered and analyzed during drilling operations (e.g., during logging while drilling (LWD) operations), during wireline logging operations, or during other types of activities.

The computing subsystem 110 can receive and analyze the measurement data from the logging tool 102 to detect the subsurface layers 122. For example, the computing subsystem 110 can identify the boundary locations and other properties of the subsurface layers 122 based on the resistivity measurements acquired by the logging tool 102 in the wellbore 104. For example, in some cases, higher resistivity indicates a higher possibility of hydrocarbon accumulation.

In some cases, the boundary locations of the subsurface layers 122 are detected based on a distance to bed boundary (DTBB) analysis. For example, the resistivity logging system 108 may determine the distance to the boundary of each subsurface layer 122 from a reference point on the logging tool 102. The reference point on the logging tool 102 can represent, for example, the wellbore depth at or near the axial center of an array of transmitters and receivers in the logging tool 102, or the wellbore depth at another location. The boundary of each subsurface layer 122 can represent, for example, the wellbore depth where the subsurface layers 122 intersect the wellbore 104.

In some implementations, the logging tool 102 includes multiple antennas that each operate as a transmitter or a receiver. The transmitter antennas can employ alternating currents to generate an electromagnetic field, which can induce eddy current in the surrounding region. The eddy current can generate a magnetic field that can be detected by the receiver antennas in the logging tool 102.

Some example logging tools include multiple transmitters and multiple receivers, with each transmitter and each receiver at a different position along the longitudinal axis of the logging tool. Multiple receivers can detect a response based on the signal from a single transmitter. The signal received by two spaced-apart receivers can have a phase and amplitude difference.

In some instances, some or all of the transmitters and receivers in a single logging tool can operate at multiple electromagnetic frequencies. Measurements obtained by transmitters and receivers operated at multiple frequencies and multiple spacings can provide versatility and other advantages in formation detection. The sensitivity range may be affected by the formation, the tool's structure, or other considerations.

Various aspects of the subterranean region 120 can affect the resistivity measurements generated by the logging tool 102. For example, formation anisotropy, formation dip angle, distances to boundary, and other factors may have significant effects on resistive logging measurements, and the resistivity logging system 108 can account for these parameters to obtain accurate formation resistivity and position estimation.

In some instances, the example computing subsystem 110 uses an inversion technique to obtain information on the formation parameters based on the resistivity measurement data generated by the logging tool 102. Some example inversion techniques operate by searching for an optimum or otherwise acceptable match between simulated data and measurements. The simulated data can be generated with assumptions of formation parameters, including horizontal resistivity, vertical resistivity, dip angle, boundary position, etc.

In some cases, the example resistivity logging system 108 can generate fast, real-time distance to boundary calculations. For example, in the drilling context, the location of a current logging point can be important for making on-site drilling decisions. When the formation resistivity is known, one-dimensional (1D) inversion code can obtain the distance to bed boundaries (DTBB) with directional LWD measurements and can give the inversion result when enough measurements are available.

For some example inversion techniques, two unknown distances (e.g., the distances to upper and lower boundaries) can be determined from at least two different raw measurements from the logging tool 102. For example, the two raw measurements may be needed to reduce uncertainty. In some instances, the logging tool 102 obtains two or more raw measurements at a single logging location in the wellbore 104, and transmits all of the raw measurements to the computing subsystem 110 for analysis (e.g., for distance to bed boundary calculations).

In some cases, the computing subsystem 110 can use an inversion technique that operates on a single raw measurement for an individual logging location in the wellbore 104. There are a variety of circumstances where only one of the raw measurements for a logging location is available at the computing subsystem 110. For example, telemetry technology constraints (e.g., data transmission speed, bandwidth, data corruption, etc.) may limit the amount of data that can be transmitted from the logging tool 102 to the computing subsystem 110 in real time (or within other time consideration). As another example, some of the raw measurements for a logging location may be too weak, for example, due to the balance electric effect near the center of a subsurface layer.

In some implementations, the computing subsystem 110 can use a robust inversion technique for determining the distance to bed boundaries (DTBB) based on the difference between resistivity measurements at different logging tool positions in the wellbore 104. The robust inversion technique may, in some instances, identify distances to upper and lower bed boundaries in real-time with one measurement from each of the logging locations. For example, the computing subsystem 110 can determine the two unknown distances (e.g., the distances to upper and lower boundaries) using a single raw measurement for a first logging location and a gradient of the raw measurement with respect to a second (previous) logging location.

Figure 2:
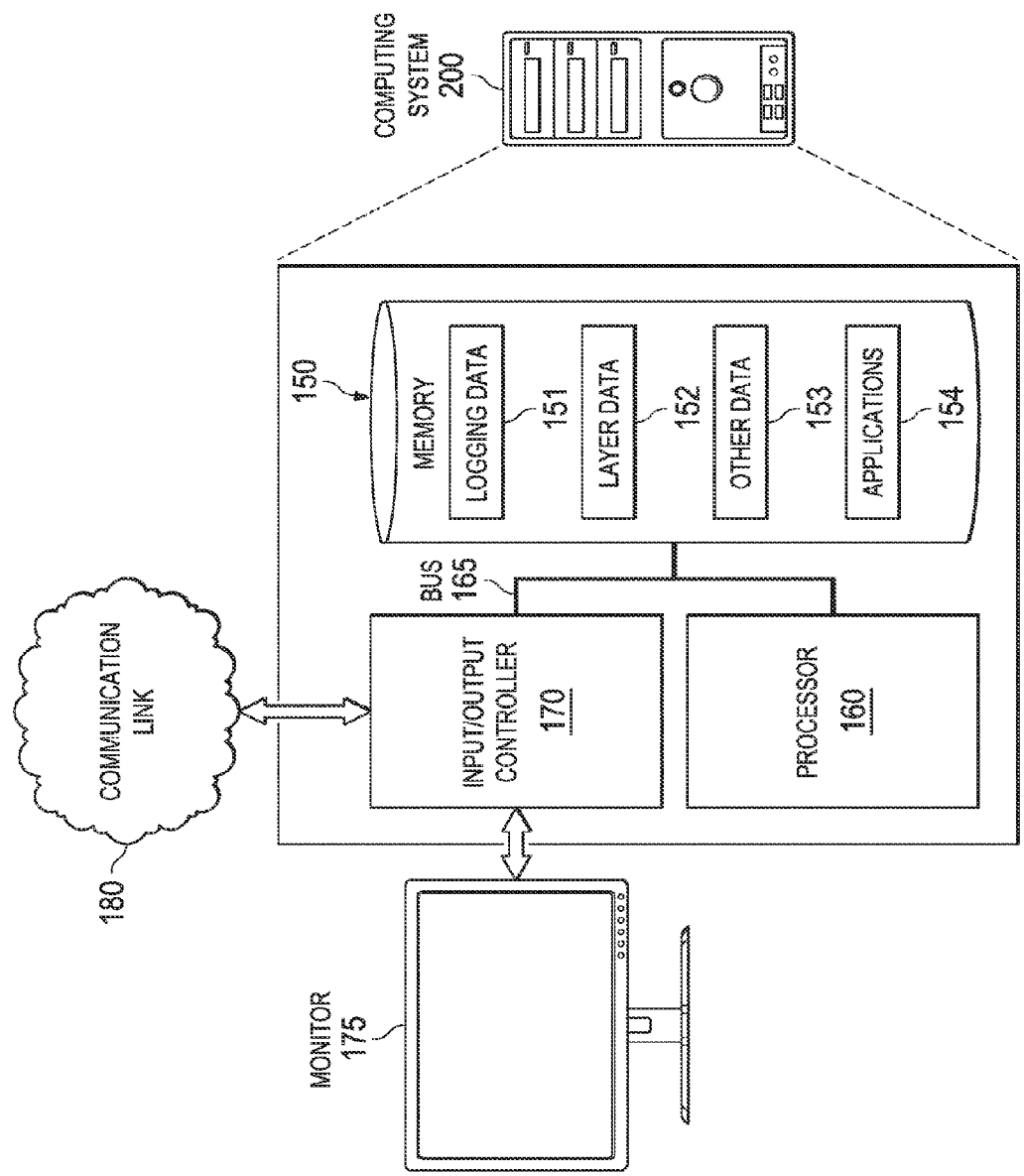
FIG. 2 is a diagram of an example computing system.

FIG. 2 is a diagram of the example computing system 200. The example computing system 200 can be used as the computing subsystem 110 of FIG. 1A, or the example computing system 200 can be used in another manner. In some cases, the example computing system 200 can operate in connection with a well system (e.g., the well system 100 shown in FIG. 1A) and be located at or near one or more wells of a well system or at a remote location. All or part of the computing system 200 may operate independent of a well system.

The example computing system 200 shown in FIG. 2 includes a memory 150, a processor 160, and input/output controllers 170 communicably coupled by a bus 165. The memory 150 can include, for example, a random access memory (RAM), a storage device (e.g., a writable read-only memory (ROM) or others), a hard disk, or another type of storage medium. The computing subsystem 110 can be pre-programmed or it can be programmed (and reprogrammed) by loading a program from another source (e.g., from a CD-ROM, from another computer device through a data network, or in another manner).

In some examples, the input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing system 200. As shown in FIG. 2, the example memory 150 includes logging data 151, layer data 152, other data 153, and applications 154. The data and applications in the memory 150 can be stored in any suitable form or format.

The logging data 151 can include measurements and other data from a logging tool. In some cases, the logging data 151 include one or more measurements for each of multiple different logging points in a wellbore. For example, the logging point associated with a given measurement can be the location of the logging tool's reference point when the given measurement was acquired.

The logging data 151 can include information derived from one or more measurements. For example, the logging data 151 can include differences between measurements from each logging point, and other types of information derived from the raw measurements. Each measurement and associated information in the logging data 151 can include raw or processed data, or a combination of them. Each measurement can include data obtained by one or more transmitter-receiver pairs operating at one or more signal frequencies. Each measurement can include data obtained by multiple transmitter-receiver pairs operating at one or more transmitter-receiver spacings.

The layer data 152 can include information on subsurface layers. For example, the layer data 152 can include information describing the resistivity, size, depth, volume, geometry, areal extent, porosity, pressure, and other information on a subsurface layer. In some implementations, the layer data 152 includes information generated by an inversion engine. For example, the layer data 152 may include distance to bed boundary information derived from resistivity measurements and other information in the logging data 151. Accordingly, the layer data 152 may include information associated with one or more logging points. For example, the layer data 152 may indicate the distance from a logging point to one or more layer boundaries.

The other data 153 can include other information that is used by, generated by, or otherwise associated with the applications 154. For example, the other data 153 can include simulated data or other information that can be used by an inversion engine to produce the layer data 152 from the logging data 151.

The applications 154 can include software applications, scripts, programs, functions, executables, or other modules that are interpreted or executed by the processor 160. For example, the applications 154 can include an inversion engine, a gradient calculator, and other types of modules. The applications 154 may include machine-readable instructions for performing one or more of the operations related to FIGS. 5-7.

The applications 154 can obtain input data, such as logging data, simulation data, or other types of input data, from the memory 150, from another local source, or from one or more remote sources (e.g., via the communication link 180). The applications 154 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 154 by executing or interpreting the software, scripts, programs, functions, executables, or other modules contained in the applications 154. The processor 160 may perform one or more of the operations related to FIGS. 5-7. The input data received by the processor 160 or the output data generated by the processor 160 can include any of the logging data 151, the layer data 152, or the other data 153.

Figure 3:
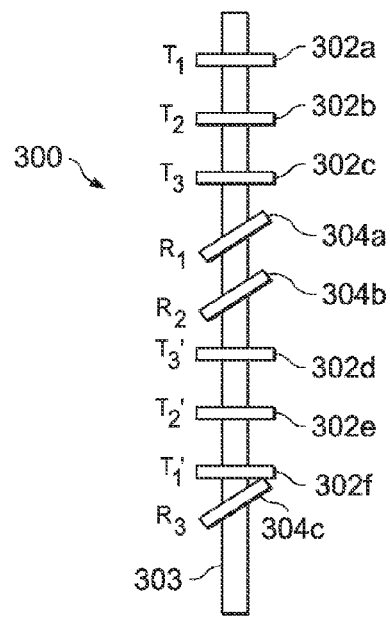
FIG. 3 is a diagram of an example resistivity logging tool.

FIG. 3 is a diagram of an example resistivity logging tool 300. The example resistivity logging tool 300 can be used in the resistivity logging system 108 shown in FIG. 1A, for example, as the logging tool 102, as a component of the logging tool 102 or in another manner. The example resistivity logging tool 300 can be used in other types of systems (including other types of resistivity logging systems) or in other contexts (e.g., in other types of well systems).

Generally, a directional resistivity tool has a number (N) of tilted or coaxial transmitter antennas $T_1, T_2, T_3, \ldots, T_N$ spaced along the tool, and a number (N') of tilted or coaxial receiver antennas $R_1, R_2, R_3, \ldots, R_{N'}$ that are axially spaced apart from the transmitter antennas and from each other. In some instances, after the resistivity logging tool has been placed in a wellbore, the tool can rotate and collect receiver measurements excited by multi-spacing and multi-frequency current source transmitters. Measurements acquired by a directional resistivity tool at different frequencies and spacings may have different sensitivities to formation parameters and different detection ability, even for the same parameter. In some instances, long transmitter/receiver spacings perform deep measurements for bed boundary and shoulder resistivity, while short transmitter/receiver spacings provide accurate information of a local area.

The example resistivity logging tool 300 is one example of a directional resistivity tool. The example resistivity logging tool 300 includes a tool body 303, six transmitters 302a, 302b, 302c, 302d, 302e, 302f and three receivers 304a, 304b, 304c. A resistivity logging tool can include additional features, such as, for example, data processing apparatus to control operation of the transmitters and receivers, a power supply to power the transmitters and receivers, a computing subsystem to process data from the transmitters and receivers, a telemetry system for communicating with external systems, etc. A resistivity logging tool can include a different number of transmitters, a different number of receivers, or both, and the transmitters and receivers can be arranged as shown in FIG. 3 or in another type of arrangement.

The tool body 303 can include structures, components, or assemblies to support the transmitters, receivers, and possibly other components of the resistivity logging tool 300. The tool body 303 can be connected to other components of a resistivity logging system, such as, for example, a drilling assembly, a wireline assembly, or another type of component. The example tool body 303 shown in FIG. 3 defines a longitudinal axis of the resistivity logging tool 300, and each transmitter or receiver is fixed at a different position along the longitudinal axis.

During operation, the tool body 303 can be moved within a wellbore through a series of logging points. At each logging point, some or all of the transmitters and receivers can be operated at one or more signal frequencies to collect resistivity data, which can be processed at the resistivity logging tool 300, transmitted to another system for processing, or both.

In the discussion that follows, the transmitters 302a, 302b, 302c, 302d, 302e, and 302f are referred to as $T_1, T_2, T_3, T_{3'}, T_{2'}$, and $T_{1'}$, respectively, and the receivers 304a, 304b, and 304c are referred to as $R_1, R_2$, and $R_3$, respectively. Generally, the transmitter elements and receiver elements can be disposed at any angle with respect to the longitudinal axis of the resistivity logging tool 300. In the example shown in FIG. 3, the transmitters $T_1, T_2, T_3, T_{3'}, T_{2'}$, and $T_{1'}$ are each coaxial with the longitudinal axis, and the receiver elements $R_1, R_2$, and $R_3$ are tilted at an angle of 45 degrees with respect to the longitudinal axis. In some cases, the transmitters can be tilted and the receivers can be coaxial; and in some cases, the transmitters and receivers are all tilted, and the transmitter and receiver tilt angles can be the same or they can be different. In addition, the roles of transmitters and receivers may be interchanged. Transmitter elements and receiver elements in other configurations can be used.

The spacing of the antennas along the longitudinal axis may be stated in terms of a length parameter x. In some implementations of the example resistivity logging tool 300, the length parameter x is equal to 16 inches; another value of the length parameter may be used. In the example shown in FIG. 3, measuring along the longitudinal axis from a midpoint between the centers of receiver antennas $R_1$ and $R_2$, transmitters $T_3$ and $T_{3'}$ are located at +1x (e.g., ±16 inches), transmitters $T_2$ and $T_{2'}$, are located at ±2x (e.g., ±32 inches), and transmitters $T_1$ and $T_{1'}$ are located at ±3x (e.g., ±48 inches); the receiver antennas $R_1$ and $R_2$ are located at ±x/4 (e.g., ±4 inches), and the receiver antenna $R_3$ is located at −4x (e.g., −64 inches). The transmitters and receivers may be placed at different locations.

The length parameter and spacing coefficients may be varied as desired to provide greater or lesser depth of investigation, higher spatial resolution, or higher signal to noise ratio. With the illustrated spacing, symmetric resistivity measurements can be made with 1x, 2x, and 3x spacing between the tilted receiver antenna pair $R_1$-$R_2$, and the respective transmitters in each of the equally-spaced pairs $T_1$-$T_{1'}$; $T_2$-$T_{2'}$; $T_3$-$T_{3'}$. In addition, asymmetric resistivity measurements can be made with 1x, 2x, 3x, 5x, 6x, and 7x spacing between the tilted receiver antenna $R_3$ and the respective transmitters $T_1, T_2, T_3, T_{3'}, T_{2'}$, and $T_{1'}$. In some cases, this spacing configuration provides versatility, enabling deep (but asymmetric) measurements for bed boundary detection and symmetric measurements for accurate azimuthal resistivity determination.

In some aspects of operation, each of the six transmitters $T_1, T_2, T_3, T_{3'}, T_{2'}$, and $T_{1'}$ can be energized in turn, and the phase and amplitude of the resulting voltage induced in each of the three receiver coils $R_1, R_2$, and $R_3$ can be measured. Measurement over a full rotation (360 degrees of rotation) can be acquired while the tool rotates at a given logging position in the wellbore. The measurements distributed over 360 degrees can be divided into M bins, where each bin covers an angle of 360/M degrees. The first bin ("bin1") can represent the measurement in the upper right direction, perpendicular to the longitudinal axis of the logging tool. As an example, if the total number of bin is 32, then the seventeenth bin ("bin17") is the reverse (opposite) direction of "bin1." From these measurements, or a combination of these measurements, the formation resistivity can be determined.

In some implementations, because the response of the tilted antennas is azimuthally sensitive, the geosignal calculated for a bin can be used as a bed boundary indicator. An example geosignal calculation function takes the difference between phase or log amplitude for the current bin and the average phase or log amplitude for all the bins at a given axial position in the wellbore:

$$\text{geo\_att}_{R1T1}(k) = 20\log(A_{R1T1}(k)) - \frac{1}{32}\sum_{i=1...32} 20\log A_{R1T1}(i) \quad (1)$$

$$\text{geo\_pha}_{R1T1}(k) = \phi_{R1T1}(k) - \frac{1}{32}\sum_{i=1...32} \phi_{R1T1}(i) \quad (2)$$

In Equations (1) and (2) above, "geo" indicates a geosignal, "att" indicates attenuation, "pha" indicates phase, "A" indicates amplitude of voltage, "$\phi$" indicates phase of voltage, "R" indicates the receiver and "T" indicates transmitter. For example, $\text{geo\_att}_{R1T1}(k)$ indicates the geosignal attenuation of the $k^{th}$ bin measurement on receiver $R_1$ excited by $T_1$ and $\text{geo\_pha}_{R1T1}(k)$ indicates the geosignal phase of the $k^{th}$ bin measurement on receiver $R_1$ excited by $T_1$. Values of geo_pha are represented in units of degrees and values of geo_att are represented in units decibel (dB).

Equations (1) and (2) above show example geosignal calculations, which generate a resistivity logging measurement based on data acquired by operating one transmitter and receiver pair. Other types of equations can be used to generate a resistivity logging measurement, and a resistivity logging measurement can be generated based on data acquired by operating one transmitter and receiver pair, or based on data acquired by operating multiple transmitter and receiver pairs.

For example, a compensated resistivity logging measurement can be generated by averaging (or otherwise combining) data acquired by multiple symmetric transmitter-receiver pairs. The transmitter and receiver pairs can include a single transmitter and multiple receivers, a single receiver and multiple transmitters, or multiple transmitters and multiple receivers. Each transmitter and receiver pair used to generate a resistivity logging measurement can have the same transmitter-receiver spacing, or data from multiple transmitter-receiver spacings may be used to generate a resistivity logging measurement. An example of a compensated amplitude measurement $\alpha_c$ is provided as follows:

$$\alpha_{T1} = \log(A_{R2T1}) - \log(A_{R1T1}) \quad (3a)$$

$$\alpha_{T1'} = \log(A_{R1T1'}) - \log(A_{R2T1'}) \quad (3b)$$

$$\alpha_c = (\alpha_{T1} + \alpha_{T1'})/2 \quad (3c)$$

Other types of compensated or uncompensated resistivity logging measurements can be generated based on data acquired by operating one or more transmitter-receiver pairs of a resistivity logging tool.

In some implementations, one or more geosignals are generated at the resistivity logging tool 300 (e.g., by one or more processors on the resistivity logging tool 300) based on the signals acquired by the transmitters and receivers, or the geosignals can be generated external to the resistivity logging tool 300. A computing system (e.g., the computing subsystem 110 in FIG. 1A) can access the generated geosignals and perform the distance to bed boundary calculation based on the geosignals. For example, the computing system may perform an inversion method that is configured to receive multiple geosignals as inputs. The inversion method may identify the locations of one or more subsurface layer boundaries and other properties of a subterranean region.

Figure 4:
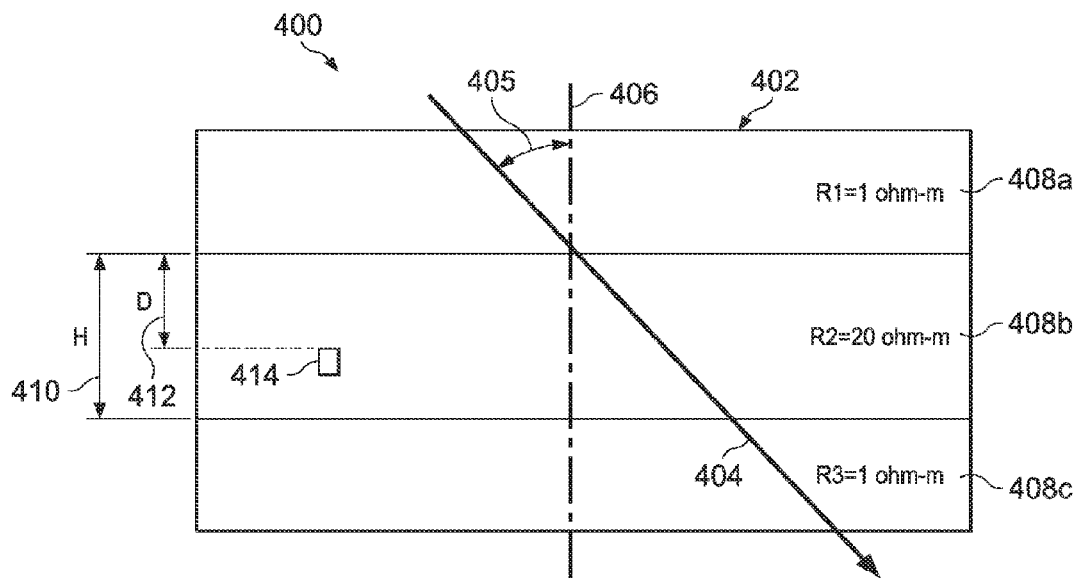
FIG. 4 is a diagram of a subterranean formation model 400 for numerical simulations.

FIG. 4 is a diagram of an example subterranean formation model 400 for numerical simulations. The example subterranean formation model 400 includes a layered formation in a subterranean region 402 and a coordinate axis 406 that represents true vertical depth (TVD) in the subterranean region 402. In the subterranean region 402 shown in FIG. 4, the formation layers each define a dip angle 405 with respect to the coordinate axis 406. The dip angle 405 can be, for example, eighty degrees or another value.

The example subterranean formation model 400 includes three subsurface layers 408a, 408b, 408c, with the middle subsurface layer 408b residing between the other two subsurface layers 408a, 408c. In the example shown in FIG. 4, the middle subsurface layer 408b is modeled as having a resistivity of 20 ohm-meters, and the two shoulder subsurface layers 408a, 408c are each modeled as having a resistivity of 1 ohm-meter. Other resistivity values can be used.

In the example shown in FIG. 4, the thickness 410 of the middle subsurface layer 408b is represented as H, and the depth 412 of a logging point 414 is represented as D. Here, the depth D represents the true vertical depth (TVD) of the logging point 414 in the subterranean region 402. In some numerical simulations, the middle subsurface layer 408b in the subterranean formation model 400 has a thickness H=5 feet. In some numerical simulations, the middle subsurface layer 408b in the subterranean formation model 400 has a thickness H=10 feet. Other values for the thickness of the middle subsurface layer 408b can be used.

Some inversion techniques can solve the distance to bed boundary (DTBB) based on multiple geosignal inputs. Here, the distance to bed boundary refers to the distance from the logging point 414 in the subsurface layer 408b to the upper and lower boundaries of the subsurface layer 408b. Some inversion techniques can produce multiple different solutions based on a single geosignal input. In some instances, using multiple geosignals from the same logging point does not reduce the number of solutions available.

For example, the ambiguity of multiple available distance to bed boundary solutions can occur when the logging point 414 is located at a position where the upper and lower subsurface layers (408a, 408c) provide the same inverse effects on the response. As a particular example, for the logging point 414 at the vertical center of the middle subsurface layer 408b, all geosignals are zero in some instances. In such instances, the effects of the two shoulder layers (i.e., subsurface layers 408a, 408c) canceled each other out, and the thickness of the subsurface layer 408b does not affect the response for the logging point 414.

Figure 5:
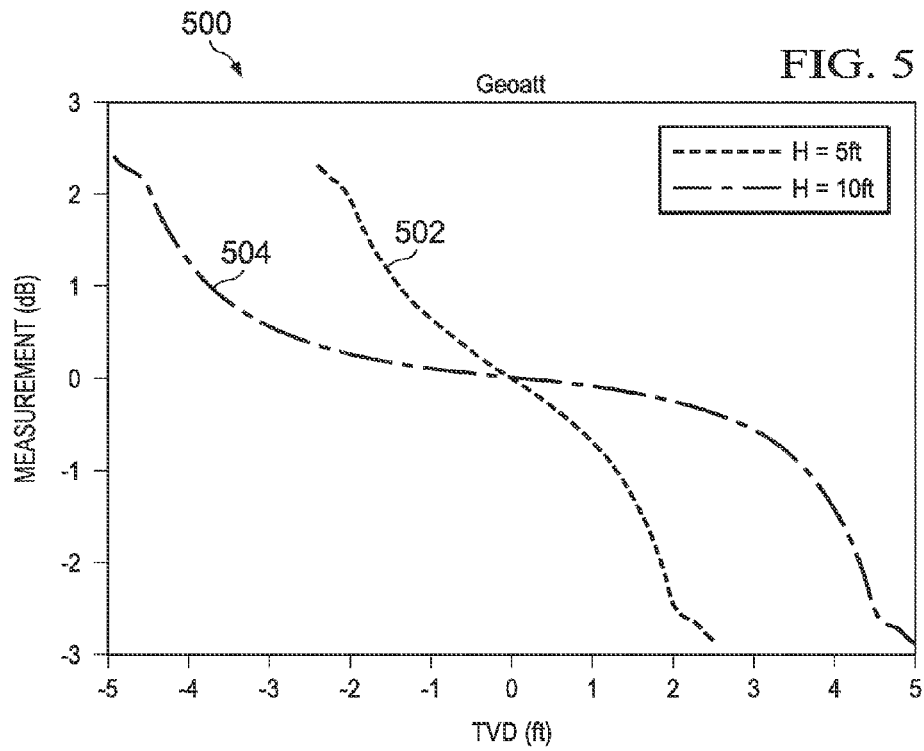
FIG. 5 is a plot of example resistivity logging measurements generated by numerical simulations.
Figure 6A:
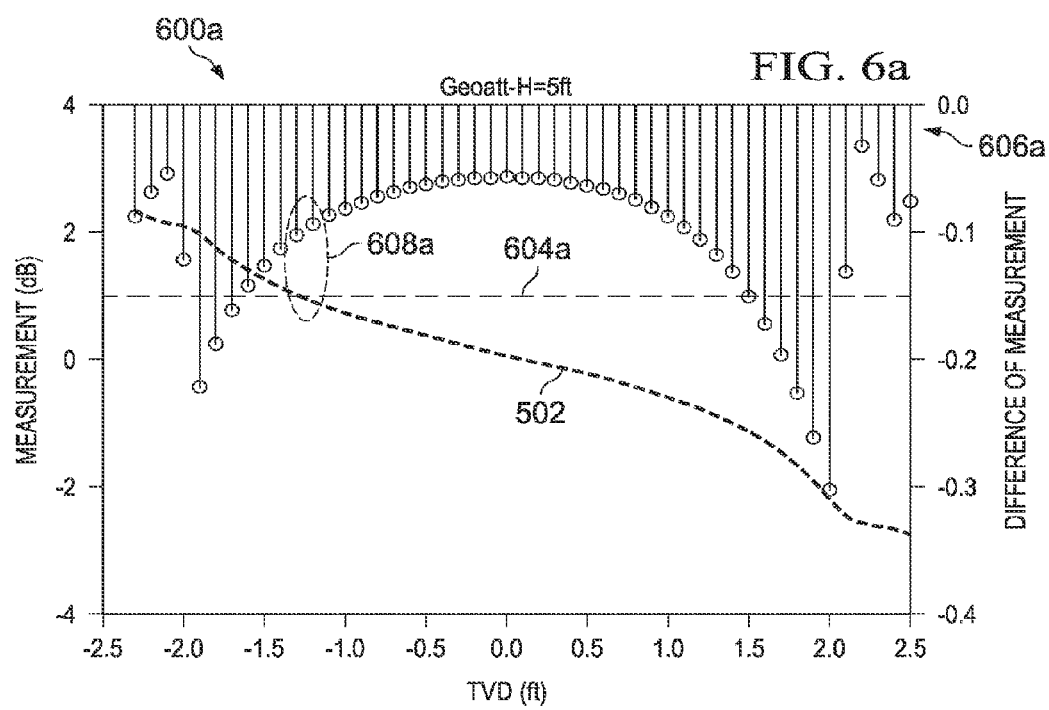
FIGS. 6A and 6B are plots of example resistivity logging data generated by numerical simulations.
Figure 6B:
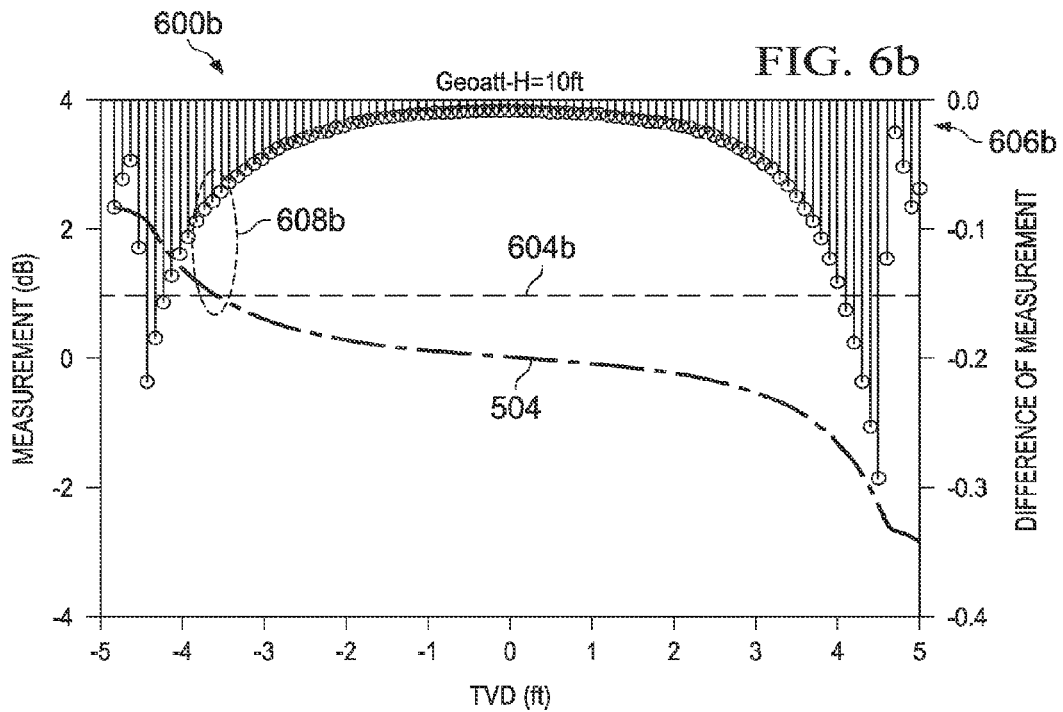

FIGS. 5, 6A, and 6B show examples of data based on numerical simulations using the subterranean formation model 400 shown in FIG. 4 with thickness values H=5 feet and H=10 feet for the middle subsurface layer 408b. In the example plots shown in FIGS. 5, 6A, and 6B, the vertical axis of each plot represents a range of values for a geosignal attenuation measurement, in units of dB. In the example plots shown in FIGS. 5, 6A, and 6B, the horizontal axis represents a range of values for the true vertical depth of a logging point, in units of feet. In the example shown, the true vertical depth is measured from the center of the middle subsurface layer 408b.

In FIGS. 5, 6A, and 6B, the example resistivity logging measurements shown in the plots are the first bin of geo_att (see Equation 1, above), since this value typically has the strongest response in azimuthal measurements. Although the response without azimuth rotating is considered in the discussion, the techniques can be extended to other types of measurements (e.g., other bins, rotating measurements, geo_pha measurements, etc.).

FIG. 5 is a plot 500 of example resistivity logging measurements generated by numerical simulations. In the plot 500, the steeper curve 502 represents simulated geosignal attenuation measurements for a series of logging points in numerical simulations using the thickness value H=5 feet; the shallower curve 502 represents simulated geosignal attenuation measurements for a series of logging points in numerical simulations using the thickness value H=10 feet. The curves 502 and 504 in the plot 500 show that the simulated geosignal attenuation measurement is the same value (zero dB) for the logging point at the vertical center of the middle subsurface layer 408b.

Because the same response occurs at the layer center for different thicknesses, the resistivity logging measurement for the vertical center (TVD=0) can lead to an ambiguous inversion result. Although the resistivity measurements are the same, the slopes or gradients of the two curves are different, even at the zero response point. For example, the gradient of the curve can be computed as the ratio of (a) the difference between the responses at two different depths and (b) the difference between the two depths. For example, when the two different depths correspond to two neighboring logging points "A" and "B", the gradient can be calculated as:

$$\Delta \text{geo\_att}_{R1T1} = \frac{geosignal(A) - geosignal(B)}{TVD(A) - TVD(B)} \quad (4)$$

The gradient can be calculated in another manner, based on additional or different information. For example, the gradient can be calculated based on other bins, other types of geosignal measurements, other types of depth information, etc.

FIGS. 6A and 6B are plots 600a, 600b of example resistivity logging data generated by numerical simulations. Each of the plots 600a, 600b shows ten times the gradient value for each point on the curves 502, 504 (e.g., ten times Δgeo_att) shown in FIG. 5. In particular, the plot 600a in FIG. 6A includes the curve 502 (from FIG. 5) representing the resistivity logging measurements from numerical simulations where H=5 feet, and the plot 600a in FIG. 6A also includes vertical bars 606a representing the gradient value calculated according to Equation (4) above for each logging point on the curve 502. Similarly, the plot 600b in FIG. 6B includes the curve 504 (from FIG. 5) representing the resistivity logging measurements from numerical simulations where H=10 feet, and the plot 600b in FIG. 6B also includes vertical bars 606b representing the gradient value calculated according to Equation (4) above for each logging point on the curve 504.

As shown by comparing the vertical bars 606a, 606b near the middle of the subsurface layer, at the true vertical depth of zero (where the response signal is zero) the values of the gradient for thickness H=5 feet are greater than the values of the gradient for thickness H=10 feet. As such, the gradient can be used to remove the ambiguity and distinguish among the solutions that are available for the zero response signal.

As shown by comparing the vertical bars 606a, 606b at other depths in the subsurface layer, there is also a different gradient value for other logging point with the same response.

For example, the circled region 608a in FIG. 6A shows that when geo_att=1 dB for H=5 feet, ten times the gradient is approximately −0.10, and the circled region 608b in FIG. 6A shows that when geo_att=1 dB for H=10 feet, ten times the gradient is approximately −0.08. Accordingly, the gradient of one measurement can be used to invert the accurate distance to boundary without multiple solutions.

In some cases, the distance to bed boundary can be determined based on the gradient, for example, by using a distance to bed boundary (DTBB) mapping chart or other information generated by numerical simulations. For example, the DTTB mapping chart can include simulated gradient signals for a range of layer thickness, layer resistivity, layer dipping angle, and possibly other parameters. The measurement-based gradient signal (i.e., the gradient value derived from logging measurements) can be compared to a library or database of simulated gradient signals, and the simulated gradient signal that matches the measurement-based gradient signal can be selected. The distance to bed boundary can then be identified from the parameters of the simulation that produced the matching simulated gradient signal.

Some example inversion techniques define a cost function, and identify a formation parameter based on minimizing the cost function. A cost function can be built, for example, from the difference between raw measurements (or measurement-based data) and a simulation result from modeling. The inversion result (e.g., the distance to bed boundary, or another formation parameter) can be calculated by minimizing the cost function. The optimization can be implemented, for example, based on the least squares method, the Marquardt-Levenberg method, the Gauss-Newton method, or another technique. Other inversion techniques or algorithms may be used.

Figure 7:
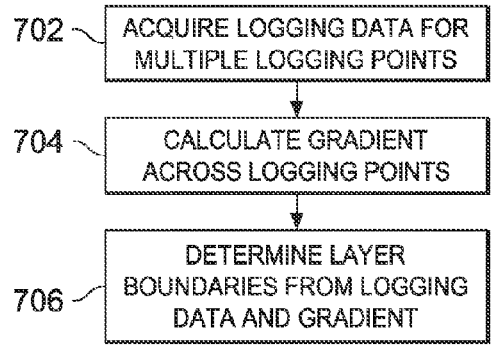
FIG. 7 is a flowchart showing an example technique for identifying subterranean layer boundaries.

FIG. 7 is a flowchart showing an example process 700 for identifying subterranean layer boundaries. Some or all of the operations in the process 700 can be implemented by one or more computing devices. For example, the process 700 can be implemented by the computing subsystem 110 in FIG. 1A, the computing system 200 in FIG. 2, or by another type of system. Some or all of the operations in the process 700 can be implemented by one or more computing devices that are embedded with, or otherwise operated in connection with, a logging tool. For example, the process 700 can be implemented in connection with the logging tool 102 in FIG. 1A, the resistivity logging tool 300 in FIG. 3, or another type of tool.

In some implementations, the process 700 may include additional, fewer, or different operations performed in the order shown in FIG. 7, or in a different order. Moreover, one or more of the individual operations or subsets of the operations in the process 700 can be performed in isolation, or as part of another process. Output data generated by the process 700, including output data generated by intermediate operations, can include stored, displayed, printed, transmitted, communicated or processed information.

In some implementations, some or all of the operations in the process 700 are executed in real time during a drilling operation or another type of operation performed in a well system. An operation can be performed in real time, for example, by performing the operation in response to receiving data (e.g., from a sensor or monitoring system) without substantial delay. An operation can be performed in real time, for example, by performing the operation while monitoring for additional data. Some real time operations can receive an input and produce an output during drilling operations; in some instances, the output is made available within a time frame that allows an operator (e.g., a human or machine operator) to respond to the output, for example, by modifying the drilling operation.

As an initial matter (e.g., before the operation 702), in some cases, a distance to bed boundary (DTBB) mapping chart can be built up with known resistivity and dipping angles. The chart can include, for example, the simulated measurement and the gradient of the simulated measurement under different thicknesses and true vertical depths. Examples of simulated measurements and gradients of the simulated measurements under different thicknesses and true vertical depths are shown in FIGS. 6A and 6B. Such information can be generated using a subterranean formation model such as, for example, the subterranean formation model 400 shown in FIG. 4 or another type of model.

In some implementations, a resistivity logging tool can be placed in a wellbore defined in a subterranean region that includes multiple subsurface layers. For example, the resistivity logging tool can be the logging tool 102 shown in FIG. 1A. The resistivity logging tool can be transported by a drilling assembly, by a wireline logging assembly, or other hardware. The resistivity logging tool can be operated at multiple tool depths in the wellbore, and each tool depth can represent a different logging point.

At 702, logging data for multiple logging points are acquired. For example, each logging point can represent a particular tool depth in a wellbore, and the logging data can be acquired by operating a transmitter and a receiver (which may include operating multiple transmitters and multiple receivers) of the resistivity logging tool at each tool depth. In some instances, the logging data are used to generate a measurement for each tool depth in the wellbore. For example, a first measurement can be generated from the data acquired at a first tool depth, and a second measurement can be generated from the data acquired at a second tool depth.

The first and second tool depths can be consecutive logging points, or there can be one or more other logging points between the first and second tool depths. The measurement for each tool depth can be an individual value (e.g., a signal attenuation measurement in units of dB, a signal phase measurement in units of degrees or radians) or multiple values. For example, resistivity logging measurements can be any of a variety of geosignal types. Some examples of resistivity logging measurements are the geosignals calculated according to Equations (1), (2), and (3) above; other types of resistivity logging measurements can be used. Some examples of simulated measurements are shown in FIGS. 5, 6A, and 6B.

In some instances, the resistivity logging tool is initially operated at the second tool depth to acquire a second logging data set, and the second resistivity logging measurement is generated based on the second logging data set. Then, the resistivity logging tool is moved from the second tool depth to the first tool depth, and the resistivity logging tool is operated at the first tool depth to acquire a first logging data set. The first resistivity logging measurement can then be generated based on the first data set. The first and second resistivity logging measurements can each be generated from data acquired by energizing the transmitter at the same electromagnetic frequency. For example, the first and second logging data sets can each correspond to the same electromagnetic frequency.

In some instances, the first resistivity logging measurement is generated based on operating multiple transmitters and multiple receivers, and the second resistivity logging measurement is generated based on operating the same transmitters and receivers. For example, the first and second resistivity logging measurements can each be compensated measurements based on operating multiple symmetric transmitter-receiver pairs of the resistivity logging tool.

In some instances, the first and second resistivity logging measurements are uncompensated measurements. For example, the first and second resistivity logging measurements can each be generated based on data acquired by a single transmitter-receiver pair operated at different depths in the wellbore. In some instances, the resistivity logging tool is rotated on its longitudinal axis while operating the transmitter and receiver. The first and second resistivity logging measurements can be generated based on data acquired at a single orientation or at multiple orientations of the resistivity logging tool.

At 704, the gradient across multiple logging points is calculated. The gradient can be associated with a current logging point or any other logging point that was acquired at 702. The gradient can be calculated based on measurements from two neighboring logging points, or the gradient can be calculated based on measurements from two non-neighboring logging points. In some cases, the gradient associated with a logging point is generated by subtracting measurements associated with two different tool depths, and dividing by the distance between the two different tool depths. For example, the gradient may be calculated according to Equation (4), above, or based on another equation.

In some instances, the gradient is calculated based on more than two logging points. For example, three, four, five, or more logging points may be used. As such, the gradient associated with a particular tool depth can be calculated from the measurement associated with the particular tool depth, and similarly-acquired measurements associated with multiple different tool depths.

At 706, subsurface layer boundaries are determined from the logging data and the gradient associated with a logging point. For example, the distances from the current logging position to the upper and lower layers can be determined from the gradient and the measurement, based on the DTBB mapping chart or another analysis tool. As an alternative to or in addition to using a DTBB mapping chart, the subsurface layer boundaries can be determined with a look-up table or an iteration inversion code.

In some cases, the subsurface layer boundary locations are determined by a computing device or other type of data processing apparatus that operates in the wellbore. For example, the computing device can be integrated (e.g., structurally integrated) with the resistivity logging tool. In some cases, the subsurface layer boundary locations are determined by a computing device or other type of data processing apparatus that operates above the ground surface, external to the wellbore.

Any appropriate inversion technique can be used to determine the boundary locations. In some instances, the upper and lower boundaries of a single subsurface layer are detected. The first tool depth, the second tool depth, or both may reside between the detected upper and lower boundaries of the subsurface layer. In some cases, the boundaries of multiple subsurface layers are detected. For example, the upper and lower boundaries of two, three, four, five, or more subsurface layers may be detected.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

In one general aspect, subsurface layer boundaries are identified based on differences between measurements associated with multiple different resistivity logging tool depths.

In some aspects, first and second resistivity logging measurements are accessed. The first resistivity logging measurement is associated with a first tool depth in a wellbore defined in a subterranean region that includes multiple subsurface layers. The first resistivity logging measurement is generated based on operating a transmitter and a receiver of a resistivity logging tool while the resistivity logging tool resides at the first tool depth in the wellbore. A gradient associated with the first tool depth is calculated from the first resistivity logging measurement and the second resistivity logging measurement. The second resistivity logging measurement is generated based on operating the transmitter and the receiver while the resistivity logging tool resides at a second, different tool depth in the wellbore. A boundary location for one or more of the subsurface layers is determined based on the gradient and the first resistivity logging measurement.

Implementations of these and other aspects may include one or more of the following features. The first resistivity logging measurement is generated based on operating multiple transmitters and multiple receivers of the resistivity logging tool while the resistivity logging tool resides at the first tool depth. The second resistivity logging measurement is generated based on operating the same transmitters and receivers of the resistivity logging tool while the resistivity logging tool resides at the second tool depth. The first and second resistivity logging measurements are compensated measurements, generated based on data acquired by multiple symmetric transmitter-receiver pairs of the resistivity logging tool.

Additionally or alternatively, implementations of these and other aspects may include one or more of the following features. The first and second resistivity logging measurements are uncompensated measurements, generated based on data acquired by a single transmitter-receiver pair. The first and second resistivity logging measurements are each generated from data acquired by energizing the transmitter at the same electromagnetic frequency.

Additionally or alternatively, implementations of these and other aspects may include one or more of the following features. The first and second resistivity logging measurements are generated based on a phase or an amplitude (or both) of an electromagnetic signal detected by the receiver while the transmitter is energized with an electromagnetic frequency. Operating the transmitter and receiver includes rotating the resistivity logging tool about a longitudinal axis of the resistivity logging tool. The first and second resistivity logging measurements are each based on data acquired at a single orientation or at multiple orientations of the resistivity logging tool.

Additionally or alternatively, implementations of these and other aspects may include one or more of the following features. Locations of upper and lower boundaries for an individual subsurface layer are determined based on the gradient and the first resistivity logging measurement. The first tool depth resides between the upper and lower boundaries of the individual subsurface layer. Determining boundary locations includes determining the distance to one or more subsurface boundaries from the first tool depth. Determining boundary locations includes performing a distance to bed boundary analysis. Determining boundary locations includes providing the gradient and the first resistivity logging measurement as inputs to an inversion engine, and receiving boundary location information as outputs from the inversion engine.

In some aspects, a resistivity logging system includes a computing system operable to determine boundary locations for a subsurface layer in a subterranean region. The boundary locations are determined based on a first resistivity logging measurement associated with a first tool depth in a wellbore defined in the subterranean region. The first resistivity logging measurement is generated based on operating a transmitter and a receiver of a resistivity logging tool while the resistivity logging tool resides at the first tool depth. The boundary locations are determined based on a gradient associated with the first tool depth. The gradient is calculated from the first resistivity logging measurement and a second resistivity logging measurement. The second resistivity logging measurement is generated based on operating the transmitter and the receiver while the resistivity logging tool resides at a second, different tool depth in the wellbore.

Implementations of these and other aspects may include one or more of the following features. The resistivity logging system includes the resistivity logging tool. The resistivity logging tool includes a tool body that defines a longitudinal axis of the resistivity logging tool, transmitter antennas disposed at multiple locations along the longitudinal axis, and receiver antennas disposed at multiple locations along the longitudinal axis. The location of a reference point on the resistivity logging tool defines the tool depth in the wellbore.

Additionally or alternatively, implementations of these and other aspects may include one or more of the following features. The resistivity logging tool is operable to acquire a first data set while operating at the first tool depth, generate the first resistivity logging measurement based on the first data set, acquire a second data set while operating at the second tool depth, generate the second resistivity logging measurement based on the second data set, and transmit the first and second resistivity logging measurements to the computing system. The resistivity logging tool is operable to acquire data from the transmitter and the receiver by detecting an electromagnetic response signal on the receiver while energizing an electromagnetic frequency on the transmitter.

Additionally or alternatively, implementations of these and other aspects may include one or more of the following features. The computing system is operable to receive the first and second resistivity logging measurements from the resistivity logging tool, compute the gradient based on the first and second resistivity logging measurements, and generate output information indicating the boundary locations for the subsurface layer. The gradient is calculated based on a ratio of (i) the difference between the first and second resistivity logging measurements and (ii) the distance between the first and second tool depths.

Additionally or alternatively, implementations of these and other aspects may include one or more of the following features. The computing system is operable to determine bed boundary locations in real time during drilling operations or wireline logging operations. The computing system is embedded in the resistivity logging tool, and the computing system is configured to operate while disposed in the wellbore.

Some implementations of these and other aspects may provide one or more of the following advantages, at least in some instances of operation. Compared with some conventional inversion methods, the techniques described here can, in some instances, distinguish among multiple solutions that are available when a logging point receives the same inverse effect from the upper and lower layers. The techniques described here can, in some instances, provide a more accurate inversion result based on a weak signal strength, or even when only one geosignal is available for a given logging point. The techniques described here can, in some instances, offer a quick and reliable inversion result for distance to bed boundaries (DTBB) with a directed resistivity logging tool. Accordingly, geosteering suggestions and other types of information can be generated based on fewer measurements, less transmitted data, fewer data computations, etc.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

The invention claimed is:

1. A method for detecting subsurface layer boundary locations, the method comprising:
   accessing a first measurement obtained based on operating a transmitter and a receiver of a resistivity logging tool at a first tool depth in a wellbore defined in a subterranean region that includes multiple subsurface layers;
   calculating a gradient associated with the first tool depth, the gradient being calculated from the first measurement and a second measurement, the second measurement obtained based on operating the transmitter and the receiver of the resistivity logging tool at a second, different tool depth in the wellbore; and
   by operation of data processing apparatus, determining a boundary location for one or more of the subsurface layers based on the gradient and the first measurement associated with the first tool depth.

2. The method of claim 1, the first measurement being obtained based on operating multiple transmitters and multiple receivers of the resistivity logging tool at the first tool depth, the second measurement being obtained based on operating the same transmitters and receivers of the resistivity logging tool at the second tool depth.

3. The method of claim 2, the first and second measurements each being measurements obtained based on data acquired by multiple symmetric transmitter-receiver pairs of the resistivity logging tool.

4. The method of claim 1, the first and second measurements each being measurements obtained based on data acquired by a single transmitter-receiver pair.

5. The method of claim 1, the first and second measurements each being obtained from data acquired by energizing the transmitter at the same electromagnetic frequency.

6. The method of claim 1, the first and second measurements each being obtained based on at least one of a phase or an amplitude of an electromagnetic signal detected by the receiver while the transmitter is energized with an electromagnetic frequency.

7. The method of claim 1, wherein operating the transmitter and receiver includes rotating the resistivity logging tool about a longitudinal axis of the resistivity logging tool, and the first and second measurements are each based on data acquired at multiple predetermined orientations of the resistivity logging tool.

8. The method of claim 1, comprising determining locations of upper and lower boundaries for an individual subsurface layer based on the gradient and the first measurement, wherein the first tool depth resides between the upper and lower boundaries of the individual subsurface layer.

9. The method of claim 1, further comprising:
operating the resistivity logging tool at the second tool depth to acquire a second data set;
obtaining the second measurement based on the second data set;
moving the resistivity logging tool from the second tool depth to the first tool depth;
operating the resistivity logging tool at the first tool depth to acquire a first data set;
obtaining the first measurement based on the first data set; and
calculating the gradient based on a ratio of (i) the difference between the first and second measurements and (ii) the distance between the first and second tool depths.

10. A non-transitory computer-readable medium encoded with instructions that, when executed by data processing apparatus, perform operations comprising:
determining boundary locations for a subsurface layer in a subterranean region based on:
a first measurement associated with a first tool depth in a wellbore defined in the subterranean region, the first measurement obtained based on operating a transmitter and a receiver of a resistivity logging tool at the first tool depth; and
a gradient associated with the first tool depth, the gradient being calculated from the first measurement and a second measurement, the second measurement obtained based on operating the transmitter and the receiver of the resistivity logging tool at a second, different tool depth in the wellbore.

11. The computer-readable medium of claim 10, wherein determining boundary locations includes performing a distance to bed boundary analysis.

12. The computer-readable medium of claim 10, wherein determining boundary locations includes:
providing the gradient and the first measurement as inputs to an inversion engine; and
receiving boundary location information as outputs from the inversion engine.

13. A resistivity logging system comprising:
a computing system configured to:
receive information obtained by a resistivity logging tool disposed in a wellbore defined in a subterranean region; and
determine boundary locations for a subsurface layer in the subterranean region based on:
a first measurement obtained based on operating a transmitter and a receiver of the resistivity logging tool at a first tool depth in the wellbore; and
a gradient calculated from the first measurement and a second measurement, the second measurement obtained based on operating the transmitter and the receiver of the resistivity logging tool at a second, different tool depth in the wellbore.

14. The system of claim 13, further comprising the resistivity logging tool, wherein the resistivity logging tool includes:
a tool body that defines a longitudinal axis of the resistivity logging tool;
transmitter antennas disposed at multiple locations along the longitudinal axis; and
receiver antennas disposed at multiple locations along the longitudinal axis.

15. The system of claim 14, wherein a location of a reference point on the resistivity logging tool defines the tool depth in the wellbore.

16. The system of claim 14 or 15, wherein the resistivity logging tool is operable to:
acquire a first data set while operating at the first tool depth;
obtain the first measurement based on the first data set;
acquire a second data set while operating at the second tool depth;
obtain the second measurement based on the second data set; and
provide the first and second measurements to the computing system.

17. The system of claim 16, wherein the computing system is configured to:
access the first and second measurements provided by the resistivity logging tool;
compute the gradient based on the first and second measurements; and
obtain output information indicating the boundary locations for the subsurface layer.

18. The system of claim 13, wherein the resistivity logging tool is configured to acquire data from the transmitter and the receiver by detecting an electromagnetic response signal on the receiver while energizing an electromagnetic frequency on the transmitter.

19. The system of claim 13, wherein the computing system is configured to determine bed boundary locations in real time during drilling operations or wireline logging operations.

20. The system of claim 13, wherein the computing system is embedded in the resistivity logging tool, and the computing system is configured to operate while disposed in the wellbore.

* * * * *

UNITED STATES PATENT AND TRADEMARK OFFICE
CERTIFICATE OF CORRECTION

| | | |
|---|---|---|
| PATENT NO. | : 9,110,188 B2 | Page 1 of 1 |
| APPLICATION NO. | : 14/358012 | |
| DATED | : August 18, 2015 | |
| INVENTOR(S) | : Tang | |

It is certified that error appears in the above-identified patent and that said Letters Patent is hereby corrected as shown below:

On the title page item [71] replace "Eneregy" with -- Energy --

In the claims

Column 20, Line 34, claim 16 after "claim 14", please delete "or 15"

Signed and Sealed this
Second Day of February, 2016

Michelle K. Lee
*Director of the United States Patent and Trademark Office*